US011209523B2

United States Patent
Meissner et al.

(10) Patent No.: US 11,209,523 B2
(45) Date of Patent: Dec. 28, 2021

(54) FMCW RADAR WITH INTERFERENCE SIGNAL REJECTION

(71) Applicant: Infineon Technologies AG, Neubiberg (DE)

(72) Inventors: Paul Meissner, Feldkirchen bei Graz (AT); Alexander Melzer, Neutillmitsch (AT)

(73) Assignee: Infineon Technologies AG, Neubiberg (DE)

( * ) Notice: Subject to any disclaimer, the term of this patent is extended or adjusted under 35 U.S.C. 154(b) by 349 days.

(21) Appl. No.: 16/370,095

(22) Filed: Mar. 29, 2019

(65) Prior Publication Data

US 2019/0317187 A1  Oct. 17, 2019

(30) Foreign Application Priority Data

Apr. 11, 2018  (DE) .................. 102018108648.2

(51) Int. Cl.
*G01S 7/35* (2006.01)
*G01S 13/34* (2006.01)
*G01S 13/53* (2006.01)
*G01S 13/931* (2020.01)

(52) U.S. Cl.
CPC .............. *G01S 7/354* (2013.01); *G01S 13/34* (2013.01); *G01S 13/53* (2013.01); *G01S 13/931* (2013.01); *G01S 7/356* (2021.05)

(58) Field of Classification Search
CPC ................................ G01S 7/354; G01S 13/34
See application file for complete search history.

(56) References Cited

U.S. PATENT DOCUMENTS

| 6,219,373 | B1 * | 4/2001 | Lee | ................ | G06F 17/148 |
| | | | | | 375/130 |
| 6,469,662 | B2 * | 10/2002 | Tullsson | .............. | G01S 7/36 |
| | | | | | 342/195 |
| 7,430,257 | B1 * | 9/2008 | Shattil | ................ | H04B 1/707 |
| | | | | | 342/367 |
| 2014/0099901 | A1 * | 4/2014 | Ruegamer | ......... | H04B 1/1027 |
| | | | | | 455/67.13 |

(Continued)

OTHER PUBLICATIONS

Wang et al., "Radiofrequency interference suppression in synthetic aperture radar based on singular spectrum analysis with extended—FAPI subspace tracking", Published in IET Radar, Sonar and Navigation, 2012, pp. 881-890.

(Continued)

*Primary Examiner* — Marcus E Windrich
(74) *Attorney, Agent, or Firm* — Harrity & Harrity, LLP (57) ABSTRACT

A method for a radar apparatus is described. According to one example implementation, the method involves receiving a multiplicity of chirp echoes from transmitted radar signals and generating a digital signal based on the multiplicity of chirp echoes. In this case, each chirp echo has an associated subsequence of the digital signal. The method further involves performing a filtering in the time domain for one or more subsequences. The filtering in this case involves the decomposition of the subsequence into a plurality of components (referred to as principal components), the selection of a subset of components from the plurality of components and the reconstruction of a modified subsequence based on the selected subset of the component.

20 Claims, 8 Drawing Sheets

(56) References Cited

U.S. PATENT DOCUMENTS

| | | | |
|---|---|---|---|
| 2014/0347213 A1* | 11/2014 | Nguyen | G01S 13/0209 |
| | | | 342/25 F |
| 2019/0004145 A1* | 1/2019 | Vossiek | G01S 7/023 |
| 2019/0079825 A1* | 3/2019 | Sud | G06F 11/0793 |

OTHER PUBLICATIONS

Sappl et al., "Low-Rank Approximation for FMCW Auto motive Radar", 2017 International Conference on Sampling Theory and Applications (SAMPTA), 2017, pp. 590-594.

* cited by examiner

FMCW RADAR WITH INTERFERENCE SIGNAL REJECTION

CROSS REFERENCE TO RELATED APPLICATION

This application claims priority under 35 U.S.C. § 119 to German Patent Application No. 102018108648.2 filed on Apr. 11, 2018, the content of which is incorporated by reference herein in its entirety.

TECHNICAL FIELD

The present description relates to the field of radar sensors, in particular to signal processing methods used in radar sensors, that allow rejection of perturbing interference.

BACKGROUND

Radio-frequency (RF) transmitters and receivers are found in a multiplicity of applications, in particular in the field of wireless communication and radar sensors. In the automotive sector, there is an increasing need for radar sensors, which can be used in driving assistance systems (advanced driver assistance systems, ADAS) such as e.g. in adaptive cruise control (ACC, or radar cruise control) systems, inter alia. Such systems can automatically adapt the speed of an automobile so as to keep a safe distance from other automobiles traveling ahead (and from other objects and from pedestrians). Further applications in the automotive sector are e.g. blind spot detection, lane change assist and the like.

Since automobiles are increasingly equipped with radar sensors, the likelihood of interference increases. That is to say that a radar signal emitted by a first radar sensor (installed in an automobile) can be injected into the reception antenna of a second radar sensor (installed in another vehicle), and in this way adversely affect operation of the second radar sensor.

SUMMARY

A method for a radar apparatus is described. According to one example implementation, the method involves receiving a multiplicity of chirp echoes from transmitted radar signals and generating a digital signal based on the multiplicity of chirp echoes. In this case, each chirp echo has an associated subsequence of the digital signal. The method further involves performing a filtering in the time domain for one or more subsequences. The filtering in this case involves the decomposition of the subsequence into a plurality of components (referred to as principal components), the selection of a subset of components from the plurality of components and the reconstruction of a modified subsequence based on the selected subset of the components.

According to one example implementation, the method involves receiving a multiplicity of chirp echoes from transmitted radar signals and generating a digital signal based on the multiplicity of chirp echoes. In this case, each chirp echo has an associated subsequence of the digital signal. The method further involves performing a filtering in the time domain for one or more subsequences by means of singular spectrum analysis.

In addition, a radar apparatus is described. According to one example implementation, the radar apparatus includes a radar receiver designed to receive a multiplicity of chirp echoes from transmitted radar signals and to generate a digital signal based on the multiplicity of chirp echoes. In this case, each chirp echo has an associated subsequence of the digital signal. The radar apparatus further has a computer unit designed to perform a filtering in the time domain for one or more subsequences. The filtering in this case involves the decomposition of the subsequence into a plurality of components, the selection of a subset of components and the reconstruction of a modified subsequence based on the selected subset of components.

BRIEF DESCRIPTION OF THE DRAWINGS

Example implementations are explained in more detail below on the basis of figures. The depictions are not necessarily to scale and the example implementations are not limited just to the depicted aspects. Rather, importance is attached to presenting the principles on which the example implementations are based. In the figures.

DETAILED DESCRIPTION

Figure 1:
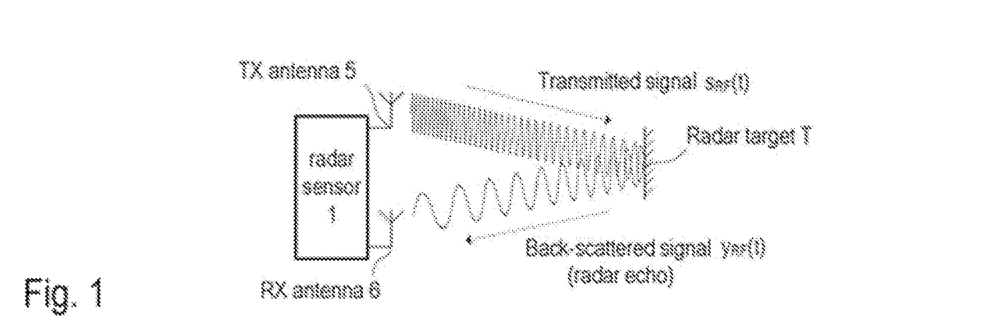
FIG. 1 shows an outline to illustrate the functional principle of an FMCW radar system for distance and/or speed measurement.

FIG. 1 uses a schematic diagram to illustrate the application of a frequency-modulated continuous-wave radar system, for the most part referred to as an FMCW radar system, as a sensor for measuring distances and speeds of objects, which are usually referred to as radar targets (targets). In the present example, the radar apparatus 10 has ten separate transmission (TX) and reception (RX) antennas 5 and 6 (bistatic or pseudo-monostatic radar configuration). However, it should be noted that a single antenna can also be used that serves as a transmission antenna and as a reception antenna at the same time (monostatic radar configuration). The transmission antenna 5 emits a continuous RF signal $s_{RF}(t)$, which is frequency-modulated with a type of sawtooth signal (periodic, linear frequency ramp), for example. The emitted signal $s_{RF}(t)$ is scattered back to the radar target T, and the backscattered/reflected signal $y_{RF}(t)$ is received by the reception antenna 6. FIG. 1 shows a simplified example; in practice, radar sensors are systems having multiple transmission (TX) and reception (RX) channels, in order also to be able to determine the angle of incidence (direction of arrival, DoA) of the backscattered/reflected signal $y_{RF}(t)$ and hence more accurately locate the radar target T.

Figure 2:
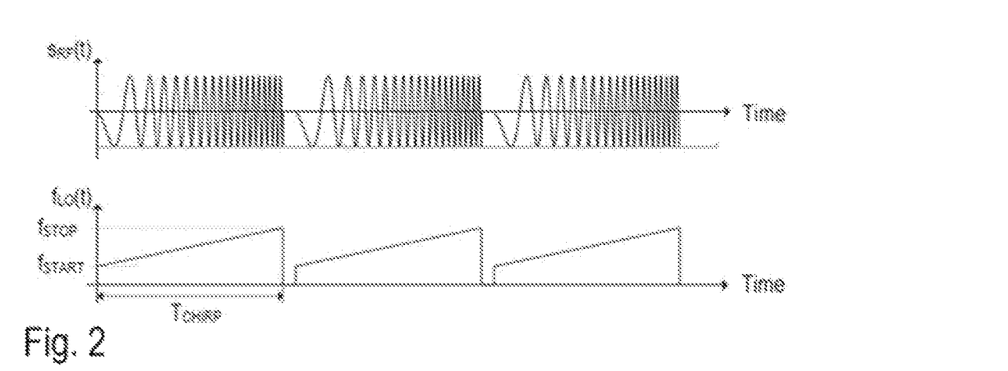
FIG. 2 comprises two timing diagrams to illustrate the frequency modulation (FM) of the RF signal generated by the FMCW system.

FIG. 2 illustrates the aforementioned frequency modulation of the signal $s_{RF}(t)$ by way of example. As depicted in FIG. 2 (upper graph), the emitted RF signal $s_{RF}(t)$ is made up of a set of "chirps", i.e. the signal $s_{RF}(t)$ comprises a sequence of sinusoidal signal characteristics (waveforms) with a rising frequency (up-chirp) or a falling frequency (down-chirp). In the present example, the instantaneous frequency f(t) of a chirp rises, beginning at a starting frequency $f_{START}$, linearly to a stop frequency $f_{STOP}$ within a time period $T_{RAMP}$ (see lower graph in FIG. 2). Such chirps are also referred to as linear frequency ramps. FIG. 2 depicts three identical linear frequency ramps. However, it should be noted that the parameters $f_{START}$, $f_{STOP}$, $T_{RAMP}$ and the pause between the individual frequency ramps can vary. The frequency variation also does not necessarily have to be linear (linear chirp). Depending on the implementation, it is also possible for transmission signals having exponential or hyperbolic frequency variation (exponential or hyperbolic chirps) to be used, for example.

Figure 3:
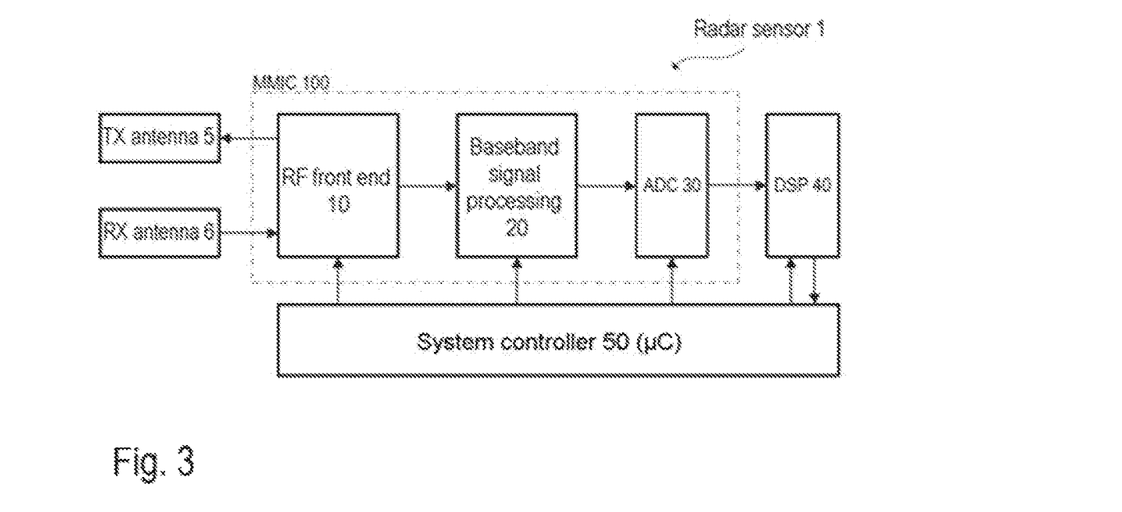
FIG. 3 is a block diagram to illustrate the basic structure of an FMCW radar system.

FIG. 3 is a block diagram depicting a possible structure of a radar apparatus 1 (radar sensor) by way of example. Accordingly, at least one transmission antenna 5 (TX antenna) and at least one reception antenna 6 (RX antenna) are connected to an RF front end 10, integrated in a chip, that can include all those circuit components that are needed for the RF signal processing. These circuit components comprise for example a local oscillator (LO), RF power amplifiers, low-noise amplifiers (LNAs), directional couplers (e.g. rat-race couplers, circulators, etc.) and mixers for down-conversion of the RF signals to baseband or an intermediate frequency band (IF band). The RF front end 10 can be integrated—possibly together with further circuit components—in a chip, which is usually referred to as a monolithic microwave integrated circuit (MMIC).

The depicted example shows a bistatic (or pseudo-monostatic) radar system having separate RX and TX antennas. In the case of a monostatic radar system, a single antenna would be used both for emitting and for receiving the electromagnetic (radar) signals. In this case, a directional coupler (e.g. a circulator) can be used to separate the RF signals to be emitted from the received RF signals (radar echo signals). As mentioned, radar systems mostly have multiple transmission and reception channels having multiple transmission and reception antennas in practice, which allows inter alia measurement of the direction (DoA) from which the radar echoes are received. In such MIMO systems, the individual TX channels and RX channels are usually each of the same or similar design.

In the case of an FMCW radar system, the RF signals emitted via the TX antenna 5 can be e.g. in the range from approximately 20 GHz to 100 GHz (e.g. around 77 GHz in some applications). As mentioned, the RF signal received by the RX antenna 6 comprises the radar echoes (chirp echo signals), i.e. those signal components that are backscattered at one or more radar targets. The received RF signal $y_{RF}(t)$ is e.g. down-converted to baseband (or IF band) and processed further in baseband by means of analog signal processing (see FIG. 3, analog baseband signal processing chain 20). The analog signal processing substantially comprises a filtering and possibly an amplification of the baseband signal. The baseband signal is finally digitized (see FIG. 3, analog-to-digital converter 30) and processed further in the digital domain. At least part of the digital signal processing chain can be implemented as software that can be executed on a processor, for example a microcontroller or a digital signal processor (see FIG. 3, DSP 40). The overall system is normally controlled by means of a system controller 50, at least part of which can likewise be implemented as software that can be executed on a processor, such as e.g. a microcontroller. The RF front end 10 and the analog baseband signal processing chain 20 (optionally also the analog-to-digital converter 30) can be integrated together in a single MMIC (i.e. an RF semiconductor chip). Alternatively, the individual components can also be distributed over multiple integrated circuits.

Figure 4:
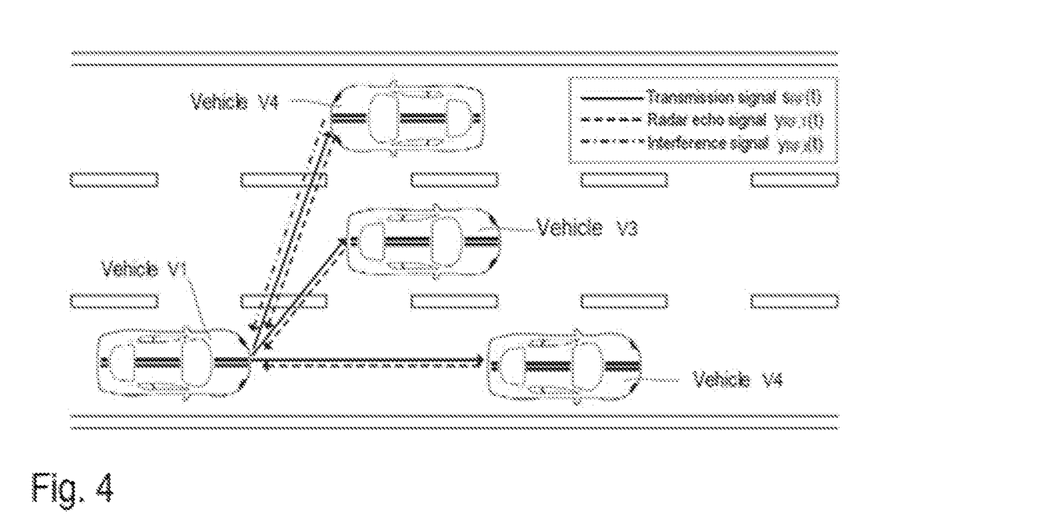
FIG. 4 is an outline to illustrate an example of how interference signals can be injected into the reception antenna of a radar sensor.
Figure 7:
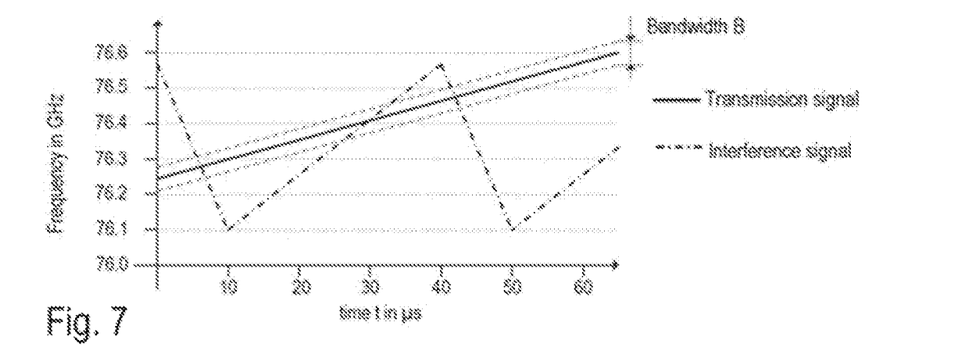
FIG. 7 shows a timing diagram for a transmission signal of a radar sensor and for a transmission signal (interference signal), causing the interference, of a further radar sensor (interferer), wherein the signal characteristics (frequency over time) of these signals partially overlap.

FIG. 4 illustrates a simple example to depict how an interferer can interfere with the received radio echoes. FIG. 7 depicts a road having three lanes and four vehicles V1, V2, V3 and V4. At least the vehicles V1 and V4 are equipped with radar sensors. The radar sensor of the vehicle V1 emits an RF radar signal $s_{RF}(t)$ and the received RF radar signal $y_{RF}(t)$ includes the radar echoes from the vehicles V2 and V3 ahead and from the oncoming vehicle V4. In addition, the RF radar signal $y_{RF}(t)$ received by the radar sensor of the vehicle V1 includes a radar signal (interference signal) that has been generated by the radar sensor of the oncoming vehicle V4. For the radar sensor of the vehicle V1, the radar sensor of the vehicle V4 is an interferer.

The signal $y_{RF}(t)$ received by the radar sensor of the vehicle V1 can be written as follows:

$$y_{RF}(t) = y_{RF,T}(t) + y_{RF,I}(t), \text{ wherein} \quad (1)$$

$$y_{RF,T}(t) = \sum_{i=0}^{U-1} A_{T,i} \cdot s_{RF}(t - \Delta t_{T,i}) \text{ and} \quad (2)$$

$$y_{RF,I}(t) = \sum_{k=0}^{V-1} A_{I,k} \cdot s_{RF,k}'(t - \Delta t_{I,k}). \quad (3)$$

In equations (1) to (3) above, the signal components $y_{RF,T}(t)$ and $y_{RF,I}(t)$ of the received signal $y_{RF}(t)$ correspond to the radar echoes from real radar targets $T_i$ and the interference signals, respectively. In practice, multiple radar echoes and multiple interferers can be present. Equation (2) thus represents the sum of the radar echoes caused by U different radar targets $T_i$, where $A_{T,i}$ denotes the attenuation of the transmitted radar signal and $\Delta t_{T,i}$ denotes the round trip delay time (RTDT) for a particular radar target $T_i$. Equally, equation (3) represents the sum of the interference signals caused by V interferers. In this case, $A_{I,k}$ denotes the attenuation of the interference signal $s_{RF,k}'(t)$ emitted by an interferer and $\Delta t_{I,k}$ denotes the associated signal delay time (for each interferer k=0, 1, . . . , V−1). It should be noted that the radar signal $s_{RF}(t)$ emitted by the vehicle V1 and the interference signal $s_{RF,0}'(t)$ emitted by the vehicle V4 (index k=0 for vehicle V4) will normally have different chirp sequences with different chirp parameters (start/stop frequency, chirp duration, repetition rate, etc.). In addition, the amplitude of the received interference signal component $y_{RF,I}(t)$ can be distinctly higher than the amplitude of the echo signal component $y_{RF,T}(t)$.

Figure 5:
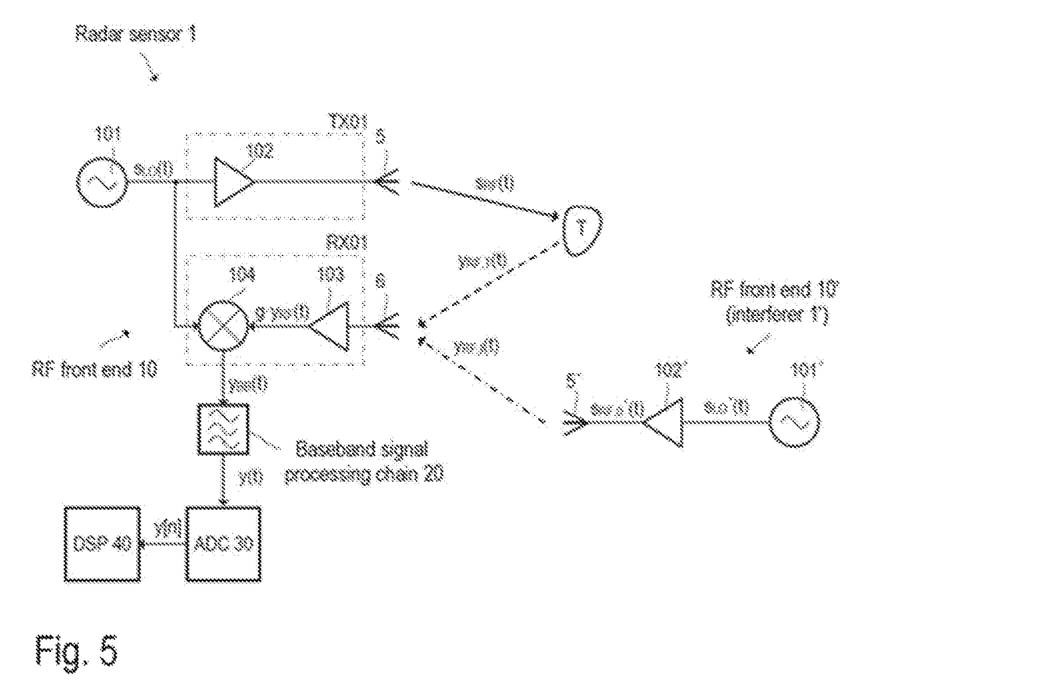
FIG. 5 is a circuit diagram to illustrate a simple example of a radar transceiver and of a further radar transceiver that causes interference.

FIG. 5 illustrates an example implementation of a radar transceiver 1 as per the example from FIG. 3 in more detail. In the present example, in particular the RF front end 10 of the radar transceiver 1 and the RF front end 10' of another (interfering) radar sensor 1' are depicted. It should be noted that FIG. 5 is a simplified circuit diagram in order to show the basic structure of the RF front end 10 with a transmission channel (TX channel) and a reception channel (RX channel). Actual implementations, which can be highly dependent on the specific application, can naturally be more complex and normally have multiple TX and/or RX channels.

The RF front end 10 comprises a local oscillator 101 (LO) that generates an RF oscillator signal $s_{LO}(t)$. The RF oscillator signal $s_{LO}(t)$ is frequency-modulated during operation, as described above with reference to FIG. 2, and is also referred to as an LO signal. In radar applications, the LO signal is usually in the SHF (Super High Frequency) or EHF (Extremely High Frequency) band, e.g. in the range from 76 GHz to 81 GHz for some automotive applications. The LO signal $s_{LO}(t)$ is processed both in the transmission signal path TX01 (in the TX channel) and in the received signal path RX01 (in the RX channel).

The transmission signal $s_{RF}(t)$ (cf. FIG. 2) emitted by the TX antenna 5 is generated by amplifying the LO signal $s_{LO}(t)$, for example by means of the RF power amplifier 102, and is thus merely an amplified version of the LO signal $s_{LO}(t)$. The output of the amplifier 102 can be coupled to the TX antenna 5 (in the case of a bistatic or pseudo-monostatic radar configuration). The received signal $y_{RF}(t)$ received by the RX antenna 6 is supplied to the receiver circuit in the RX channel and thus directly or indirectly to the RF port of the mixer 104. In the present example, the RF received signal $y_{RF}(t)$ (antenna signal) is preamplified by means of the amplifier 103 (gain g). The mixer 104 thus receives the amplified RF received signal $g \cdot y_{RF}(t)$. The amplifier 103 can be e.g. an LNA. The reference port of the mixer 104 is supplied with the LO signal $s_{LO}(t)$, so that the mixer 104 down-converts the (preamplified) RF received signal $y_{RF}(t)$ to baseband. The down-converted baseband signal (mixer output signal) is denoted by $y_{BB}(t)$. This baseband signal $y_{BB}(t)$ is initially processed further in analog fashion, wherein the analog baseband signal processing chain 20 substantially causes an amplification and a (e.g. bandpass or low-pass) filtering in order to reject undesirable sidebands and image frequencies. The resultant analog output signal supplied to an analog-to-digital converter (see FIG. 3, ADC 30) is denoted by y(t). Methods for digital further processing of the digitized output signal (digital radar signal y[n]) are known per se (for example range-Doppler analysis) and are thus not discussed further at this juncture.

In the present example, the mixer 104 down-converts the preamplified RF received signal $g \cdot y_{RF}(t)$ (i.e. the amplified antenna signal) to baseband. The mixing can be effected in one stage (that is to say from the RF band directly to baseband) or via one or more intermediate stages (that is to say from the RF band to an intermediate frequency band and on to baseband). In this case, the reception mixer 104 effectively comprises multiple individual mixer stages connected in series. In view of the example shown in FIG. 5, it becomes clear that the quality of a radar measurement is highly dependent on the quality of the LO signal $s_{LO}(t)$, for example on the noise that the LO signal $s_{LO}(t)$ contains, which is quantitatively determined by the phase noise of the local oscillator 101.

In addition, FIG. 5 shows part (the TX channel of the RF front end 10') of a further radar sensor 1', which is an interferer for the radar sensor 1. The RF front end 10' of the radar sensor 1' includes a further local oscillator 101' that generates an LO signal $s_{LO}'(t)$ that is amplified by the amplifier 102'. The amplified LO signal is emitted as an RF radar signal $s_{RF,0}'(t)$ via the antenna 5' of the radar sensor 1' (cf. equation (3)). This RF radar signal $s_{RF,0}'(t)$ contributes to the interference signal component $y_{RF,I}(t)$ received by the antenna 6 of the other radar sensor 1 and causes the aforementioned interference.

Figure 6:
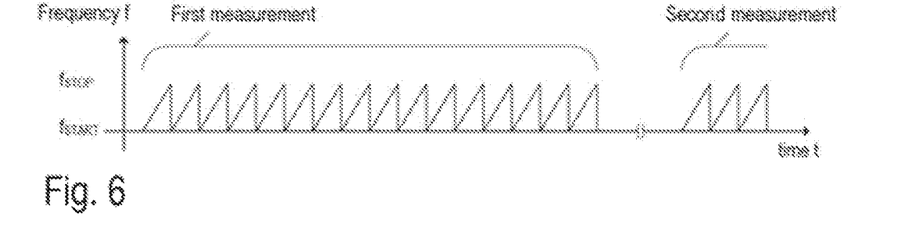
FIG. 6 uses a timing diagram (frequency over time) to show an example of a transmitted radar signal having multiple sequences of chirps, wherein each sequence has a particular number of chirps that are used for a measurement.

FIG. 6 schematically illustrates an example of an FM scheme as is usually used for the frequency modulation of the LO signal $s_{LO}(t)$ in FMCW radar sensors. In the example depicted, a sequence of chirps is generated for each measurement. In FIG. 6, the first sequence contains only 16 chirps; in practice, a sequence will have substantially more chirps, however, for example 128 or 256 chirps. A number corresponding to a power of two permits the use of efficient FFT (fast Fourier transform) for the subsequent digital signal processing (e.g. for the range/Doppler analysis). The individual sequences can have a pause between them.

Figure 8:
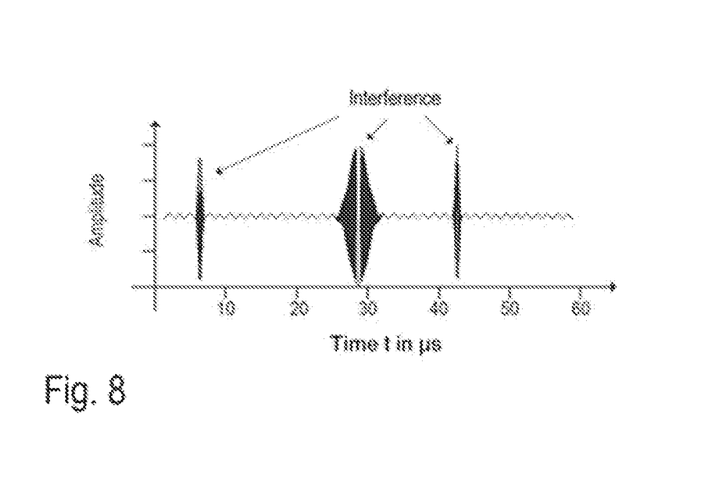
FIG. 8 shows a timing diagram for an example signal characteristic of a radar signal (after mixing to baseband) that includes a radar echo from a radar target (target) and an interference signal (interference).
Figure 9:
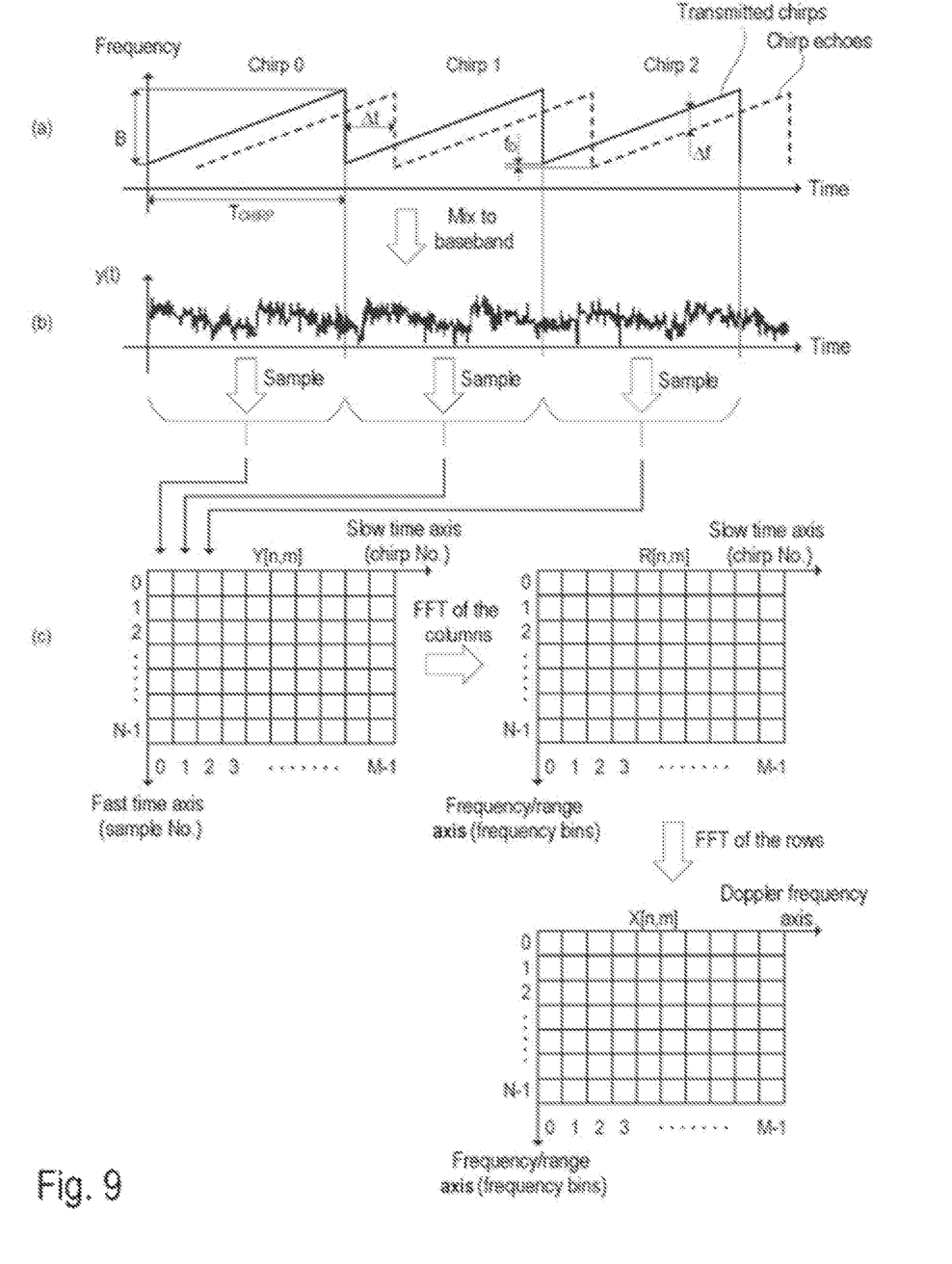
FIG. 9 uses a graph to illustrate an example of the signal processing in a radar sensor by means of range-Doppler analysis.

FIGS. 7 and 8 use an example to illustrate how an interferer can interfere with the radar echoes contained in the RF signal $y_{RF}(t)$ received by the radar sensor 1. FIG. 7 uses a graph (frequency over time) to show a chirp emitted by the radar sensor 1 with a chirp duration of 60 µs. The starting frequency of the emitted signal $s_{RF}(t)$ is approximately 76 250 MHz and the stop frequency is approximately 76 600 MHz. An interference signal $y_{RF,I}(t)$ generated by another radar sensor includes an up-chirp with a starting frequency of approximately 76 100 MHz, a stop frequency of approximately 76 580 MHz and a chirp duration of 30 µs and also a subsequent down-chirp, which starts at the stop frequency of the preceding chirp and ends at the starting frequency of the subsequent chirp and has a chirp duration of 10 µs. The bandwidth B of the baseband signal of the radar sensor is substantially determined by the baseband signal processing chain 20 and is indicated by the dashed lines in FIG. 8. FIG. 9 shows an example signal characteristic of the (preprocessed) baseband signal y(t) of the radar sensor 1. It can be seen that the signal components have a significant amplitude on the basis of the interference in that time interval in which the frequency of the interference signal is within the bandwidth B of the radar sensor (see FIG. 8). In the present example, the interference occurs three times during the chirp duration of 60 µs, namely at approximately 7 µs, 28 µs and 42 µs. As mentioned, the power of the interference signal can be higher than the power of the radar echoes from real targets. In addition, (apart from exceptions not considered at this juncture) the interference signals and the transmission signal of the radar sensor 1 under consideration are uncorrelated, which is why the interference can be regarded as noise and therefore increases the noise floor.

FIG. 9 uses an example to illustrate the analog signal processing in a radar sensor through to digitization of the baseband signal, which represents the chirp echo signals. Graph (a) from FIG. 9 shows part of a chirp sequence comprising M linear chirps. The solid line represents the signal characteristic (waveform, frequency over time) of the outgoing radar signal $s_{RF}(t)$ and the dashed line represents the corresponding signal characteristic of the incoming radar signal $y_{RF}(t)$ comprising the chirp echoes. As per graph (a) of FIG. 9, the frequency of the outgoing radar signal rises linearly, beginning at a starting frequency $f_{START}$, to a stop frequency $f_{STOP}$ (chirp No. 0) and then returns to the starting frequency $f_{START}$, rises again to the stop frequency $f_{STOP}$ (chirp No. 1), and so on.

As explained previously in reference to FIG. 6, a chirp sequence comprises a multiplicity of chirps; in the present case, the number of chirps in a sequence is denoted by M. Depending on the application, a sequence can also include chirps having different parameters (starting and stop frequency), duration and modulation pause). During a modulation pause between two successive chirps, the frequency can be e.g. the same as the stop frequency of the previous chirp or the starting frequency of the subsequent chirp (or the same as another frequency). The chirp duration can be in the range from a few microseconds to a few milliseconds, for example in the range from 20 µs to 2 ms. The actual values can also be greater or smaller depending on the application. The number M of chirps in a sequence can correspond to a power of two, e.g. M=256.

The incoming radar signal (i.e. the one received by the RX antenna) leads the outgoing radar signal (i.e. the one emitted by the TX antenna) by a time difference $\Delta t$. This time difference $\Delta t$ corresponds to the signal delay time from the TX antenna to the radar target and back to the RX antenna and is also referred to as the round trip delay time (RTDT). The distance $d_{Ti}$ of a radar target $T_i$ from the radar sensor is $d_{Ti}=c\cdot\Delta t/2$, i.e. the speed of light c times half the time difference $\Delta t$. As can be seen in graph (a) of FIG. 9, the time difference $\Delta t$ results in a corresponding frequency difference $\Delta f$. This frequency difference $\Delta f$ can be ascertained by virtue of the incoming (and possibly preamplified) radar signal $y_{RF}(t)$ being mixed with the LO signal $s_{LO}(t)$ of the radar sensor (see FIG. 5, mixer 104), the resultant baseband or IF signal y(t) being digitized and subsequently a digital spectral analysis being performed. The frequency difference $\Delta f$ then appears as a beat frequency in the spectrum of the digitized baseband signal y[n]. If linear chirps are used, the time difference $\Delta t$ can be calculated according to $\Delta t=\Delta f/k$, where the factor k denotes the gradient (hertz per second) of the frequency ramp, which can be calculated according to $k=B/T_{CHIRP}$, B being the bandwidth of a chirp ($B=|f_{STOP}-f_{START}|$). In view of the explanations above, it follows for the sought distance $d_{Ti}$ of the target $T_i$ that:

$$d_{Ti}=c\cdot\Delta t/2=c\cdot\Delta f\cdot T_{CHIRP}/(2\cdot B), \quad (4)$$

Although the fundamental functional principle of an FMCW radar sensor has been summarized above, it should be noted that more demanding signal processing is usually applied in practice. By way of example, an additional Doppler shift $f_D$ in the incoming signal on account of the Doppler effect can influence the distance measurement in that the Doppler shift $f_D$ is added to the aforementioned frequency difference $\Delta f$. Depending on the application, the Doppler shift can be estimated/calculated from the outgoing and incoming radar signals and taken into consideration for the measurement, whereas in some applications the Doppler shift can be negligible for the distance measurement. This can be the case e.g. if the chirp duration is high and the speed of the target is low, which means that frequency difference $\Delta f$ is larger in comparison with the Doppler shift $f_D$. In some radar systems, the Doppler shift can be eliminated by virtue of the distance being ascertained based on an up-chirp and a down-chirp for the distance measurement. Theoretically, the actual distance $d_T$ can be calculated as a mean value of the distance values that are obtained from a measurement with up-chirps and a further measurement with down-chirps. The averaging eliminates the Doppler shift.

An example of a signal processing technique for processing FMCW radar signals involves calculating what are known as range-Doppler maps, which are also referred to as range-Doppler images. In general, FMCW radar sensors ascertain the target information (i.e. distance, speed, DoA) by transmitting a sequence of chirps (see FIG. 9, graph (a)) and mixing the (delayed) echoes from the radar targets with a "copy" of the transmitted signal (cf. FIG. 5, mixer 104). The resultant baseband or IF signal y(t) is depicted in graph (b) of FIG. 9. The aforementioned target information can be extracted from the spectrum of the chirp echoes in baseband or in the IF band. A range-Doppler map is obtained, as explained in more detail below, by means of a two-stage Fourier transformation, for example. Range-doppler maps can be used as a basis for different methods for detection, identification and classification of radar targets.

In the examples depicted here, the calculations necessary for ascertaining the range-Doppler maps are performed by a signal processor (cf. FIG. 5, DSP 40). In other example implementations, in addition or as an alternative to a signal processor, it is also possible for other computing units to be used in order to perform the necessary calculations. Depending on the implementation, the calculations can be performed by different software and hardware units (software and hardware entities) or combinations thereof; and in general, the term computing unit is understood in this case to mean any combination of software and hardware that is able and designed to perform the calculations described in connection with the example implementations explained here.

According to an illustrative implementation, the calculation of a range-Doppler map involves two stages, with multiple Fourier transformations being calculated (e.g. by means of an FFT algorithm) in each stage. According to the present example, the baseband signal y(t) (cf. FIG. 5) is sampled such that N×M samples are obtained for a chirp sequence having M chirps. That is to say that the sampling time interval $T_{SAMPLE}$ is chosen such that each of the M chirp echoes is represented (in baseband) by a subsequence of N samples. As depicted in graph (c) of FIG. 9, these M subsequences can have N samples each arranged in a two-dimensional array Y[n, m] (radar data array). Each column in the array Y[n, m] represents a chirp echo (in baseband), and the n-th row of the array Y[n, m] contains the n-th sample of the M chirps. The row index n (n=0, 1, . . . N−1) can thus be regarded as a discrete time $n\cdot T_{SAMPLE}$ on a "fast" time axis. Equally, the column index m (m=0, 1, . . . M−1) can be regarded as a discrete time $m\cdot T_{CHIRP}$ on a "slow" time axis. The column index m corresponds to the number of the chirp in a chirp sequence.

In a first stage, a first FFT (usually referred to as a range FFT) is applied to each chirp. For each column in the array Y[n, m] the Fourier transformation is calculated. In other words, the array Y[n, m] is Fourier-transformed along the fast time axis, and the result obtained is a two-dimensional array R[n, m] of spectra that is referred to as a range-map, each of the M columns in the range map containing N (complex-value) spectral values in each case. The Fourier transformation turns the "fast" time axis into the frequency axis; the row index n of the range map R[n, m] corresponds to a discrete frequency and is thus also referred to as a frequency bin. Each discrete frequency corresponds to a distance according to equation (4), which is why the frequency axis is also referred to as a distance axis (range axis).

The range map R[n, m] is depicted in graph (c) of FIG. 9. A radar echo caused by a radar target results in a local maximum (peak) for a particular frequency index/frequency bin. Usually, this local maximum appears in all columns in the range map R[n, m], i.e. in the spectra of all chirps in a chirp sequence. As mentioned, it is possible for the associated frequency index (e.g. as per equation (4)) to be converted into a distance value.

In a second stage, a second FFT (usually referred to as a Doppler FFT) is applied to each of the N rows in the range map R[n, m]. Each row in the range map R[n, m] includes M spectral values of a particular frequency bin, each frequency bin corresponding to a particular distance $d_{T_i}$ of a particular radar target $T_i$. The Fourier transformation of the spectral values in a particular frequency bin (associable with a radar target) allows the ascertainment of the associated Doppler shift $f_D$ corresponding to a speed of the radar target. In other words, the two-dimensional array R[n, m] (the range map) is Fourier-transformed row by row, i.e. along the "slow" time axis. The resultant Fourier transforms again form an array having N×M spectral values, which is referred to as a range-Doppler map X[n, m]. The second FFT turns the "slow" time axis into the Doppler frequency axis.

The associated discrete Doppler frequency values each correspond to a particular speed. The Doppler frequency axis can accordingly be converted into a speed axis.

Each local maximum (each peak) in the range-Doppler map X[n, m] indicates a potential radar target. The row index (on the range axis) associated with a local maximum represents the distance of the target, and the column index (on the speed axis) associated with the local maximum represents the speed of the target. It goes without saying that the methodology described here for ascertaining distance and speed of radar targets based on the range-Doppler map is a comparatively simple methodology. Depending on the application, more complex and more in-depth algorithms can be used for evaluating the range-Doppler map. In some applications, calculation of a range-Doppler map is not necessary. In these cases, distances and speeds of radar targets can be calculated e.g. based on the range map without a range-Doppler map needing to be calculated beforehand.

In the case of multiple RX antennas, a range-Doppler map $X_a$[n, m] can be calculated for each RX channel, a denoting the number of the antenna and of the associated RX channel. The range Doppler maps $X_a$[n, m] can be "stacked" to produce a three-dimensional array. Equally, the output data $Y_a$[m, n] (radar data arrays) can be regarded as a three-dimensional array. This is sometimes referred to as a radar data cube.

As mentioned, the radar data cubes, the resultant range maps $R_a$[n, m] or the range-Doppler maps $X_a$[n, m] can be used as input data for different further signal processing methods. By way of example, different peak detection algorithms are known in order to detect, in the range maps $R_a$[n, m] or the range-Doppler maps $X_a$[n, m], local maxima (peaks) caused by an object (radar target) in the "field of view" of the radar sensor. Other algorithms are used e.g. for calculating the angle (of azimuth) of a radar target or for classifying detected radar targets (e.g. whether a radar target is a pedestrian).

Like all measurement data, the spectral values in a range map or a range-Doppler map contain noise. The detectability of the aforementioned local maxima and the reliability of the detection are dependent on the noise floor of the radar system. Different noise sources can contribute to the noise floor, in particular the phase noise of the local oscillator (see FIG. 4, LO 101). The interference effects on the basis of other, interfering radar sensors that were discussed earlier on can also adversely influence the detection of radar targets and the robustness and reliability of the measurement results. Interference signals correlated with the local oscillator signal can at least temporarily increase the noise floor so much that detection of radar targets becomes impossible or at least susceptible to error.

Figure 10:
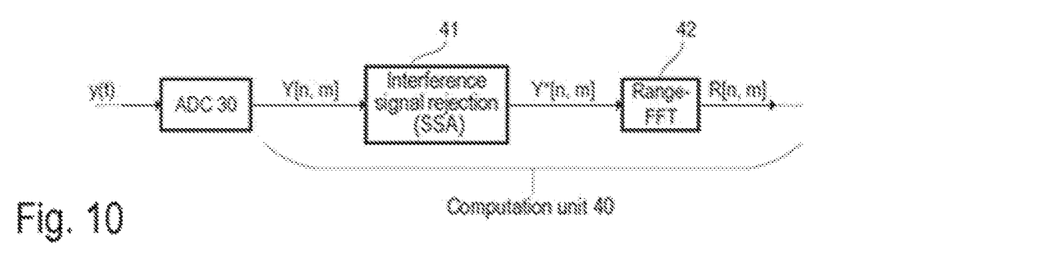
FIG. 10 uses a block diagram to illustrate an example of interference signal rejection in the time domain by means of singular spectrum analysis (SSA) before the range-Doppler analysis.

Various techniques are known for detecting interference. These techniques make it possible to detect that a measurement has been interfered with and the measurement results are thus unreliable. Other approaches are aimed at rejecting the interference signals, or reducing them by means of filter techniques. The example implementations described below relate to one possible approach to rejecting interference signal components (cf. equation (3), signal $y_{RF,I}(t)$) by means of a specific filter technique. According to the example depicted in FIG. 10, the "filtering" is effected in the time domain by means of a method referred to as "singular spectrum analysis" (SSA). The term "spectrum analysis" in the name "singular spectrum analysis" does not relate to the analysis of the frequency spectrum. The term "spectrum" relates in this context to a spectrum of eigenvalues instead, in a singular-value decomposition of the covariance matrix of the N samples of a chirp echo (i.e. of a column in a radar data array Y[n, m]). The interference signal rejection depicted in FIG. 10 is accordingly effected in the time domain. As per FIG. 10, the samples delivered by the ADC 30 can be arranged in a radar data array Y[n, m], as described above, each column in the array Y[n, m] containing N samples representing a chirp echo. This radar data array Y[n, m] is filtered by the interference signal rejection unit 41, and the modified/filtered radar data array Y[n, m] can then be processed further in a customary manner. In the example depicted, the modified/filtered radar data array Y*[n, m] is Fourier-transformed (FFT unit 42) in order to calculate a range map R[n, m].

As mentioned, the interference signal rejection unit 41 (filter unit) uses an SSA algorithm in order to reject or at least reduce interference signal components in the radar data array Y[m, n]. The SSA algorithm is executed for each chirp echo under consideration (i.e. for each column under consideration in a radar data array Y[m, n]). Not every column in the radar data array Y[m, n] has to be "filtered" in this case. In some example implementations, those chirp echoes (in baseband) that are affected by interference are initially identified. For this purpose, inherently known methods for detecting interference or for detecting chirp echoes potentially affected by interference (columns in the radar data array) can be used. As a result of this detection/identification of affected chirp echoes, a set M* of column indices is obtained that indicates which columns in a radar data array contain chirp echoes affected by interference. It holds that: M*⊆{0, . . . , M−1}. The filtering subsequently needs to be performed only for the columns in the radar data array Y[n, m] that are contained in the set M*.

Only one column in a radar data array Y[n, m] is considered below, without restricting the generality. The a-th column (a∈M*) can also be regarded as a time series $X_a$ $$Y[n,a] = \begin{pmatrix} y_a[0] \\ \vdots \\ y_a[N-1] \end{pmatrix} = X_a = (x_1, \ldots, x_N)^T. \quad (5)$$

The superscript T means, as usual, that the vector is transposed. Accordingly, the values $x_1, \ldots, x_N$ are the samples from the m-th column of the radar data array $Y[n, m]$. In a first step, referred to as "embedding", the time series $X_a$ is mapped onto a sequence of lagged vectors, as a result of which K=N−L+1 lagged vectors $X^{(i)}$ (dimension 1×L) are obtained:

$$X^{(i)} = (x_i, \ldots, x_{i+L-1}) (1 \le i \le K) \quad (6)$$

The parameter L (window length) is a positive integer greater than zero and will be explained in more detail later. These lagged vectors can be combined to produce a matrix $\tilde{X}$, which is also referred to as an L trajectory matrix) of the time series $X_u$, $$\tilde{X} = \begin{pmatrix} X^{(1)} \\ \vdots \\ X^{(K)} \end{pmatrix} = \begin{pmatrix} x_1 & \cdots & x_L \\ \vdots & \ddots & \vdots \\ x_K & \cdots & x_N \end{pmatrix}. \quad (7)$$

Figure 11:
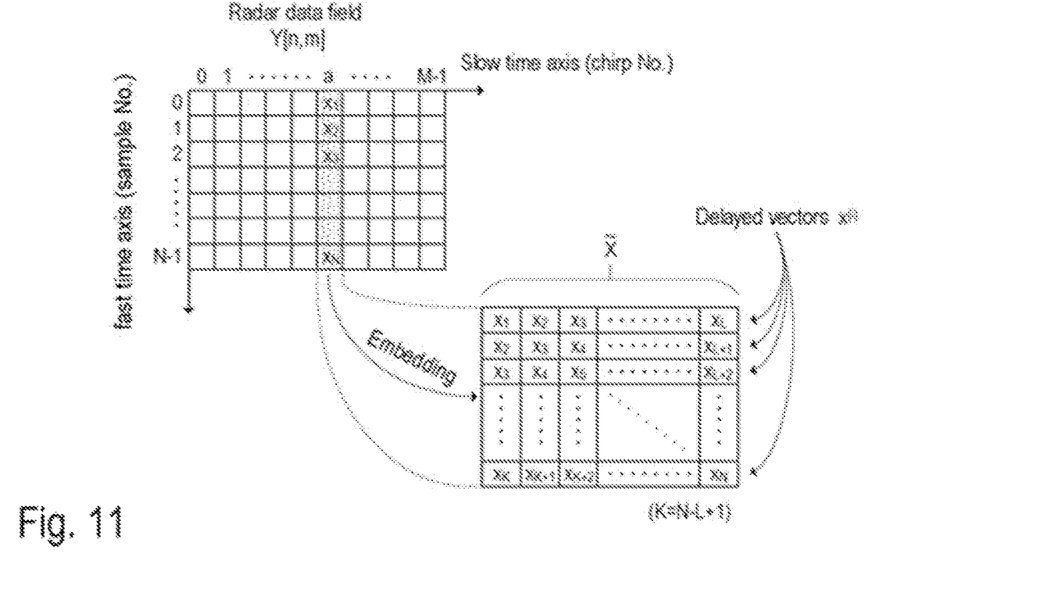
FIG. 11 illustrates the embedding step for the SSA.

The rows in the L trajectory matrix $\tilde{X}$ are formed by the lagged vectors $X^{(i)}$. Both the columns and the rows are subseries of the time series $X_a$. From equations (6) and (7), it can be seen that the L trajectory matrix $\tilde{X}$ is a Hankel matrix in which constant values occur on the antidiagonals. It should be noted that an L trajectory matrix $\tilde{X}$ can be ascertained from the time series $X_a$ (that is to say the a-th column in a radar data array) explicitly (one-to-one correspondence). The process referred to as embedding is also depicted schematically in FIG. 11.

A singular value decomposition (SVD) of the L trajectory matrix $\tilde{X}$ is performed below. To this end, a second step initially involves an estimate of the autocorrelation matrix $\tilde{C}_{XX}$ being determined, which can be calculated as follows:

$$\tilde{C}_{XX} = \frac{1}{L} \tilde{X}^T \tilde{X}. \quad (8)$$

The autocorrelation matrix $\tilde{C}_{XX}$ is a symmetrical L×L matrix and typically has the rank L.

Subsequently, a third step involves the eigenvalues $\lambda_k$ and the corresponding eigenvectors $U_k$ of the autocorrelation matrix $\tilde{C}_{XX}$ being determined, with the following eigenequation holding for the k-th eigenvector $U_k$:

$$\tilde{C}_{XX} U_k = \lambda_k U_k. \quad (9)$$

In general, the autocorrelation matrix $\tilde{C}_{XX}$ has L eigenvalues and corresponding eigenvectors and can be decomposed as follows:

$$\tilde{C}_{XX} = \tilde{U} \tilde{\Lambda} \tilde{U}^{-1}, \quad (10)$$

where the matrix $\tilde{U}$ is made up of the eigenvectors $U_k = (u_{k,1}, \ldots, u_{k,L})^T$ in columns and $\tilde{\Lambda}$ is a diagonal matrix whose diagonal contains the eigenvalues $\lambda_k$ (k=1, ..., L). Since the (estimated) autocorrelation matrix $\tilde{C}_{XX}$ is symmetrical and real, it holds that $\tilde{U}^{-1} = \tilde{U}^T$.

In a fourth step, the signal components $P_k$ referred to as principal components in a time series $X_a$ are ascertained. In this case, the samples of the time series $X_a$ (i.e. the values that the lagged vectors $X^{(i)}$ contain for the a-th column under consideration in the radar data array $Y[n, m]$) are projected onto the eigenvectors $U_k$. The principal components $P_k$ can be calculated according to the following equation:

$$P_k = \tilde{X} U_k = \begin{pmatrix} X^{(1)} U_k \\ \vdots \\ X^{(K)} U_k \end{pmatrix} = \begin{pmatrix} p_{k,1} \\ \vdots \\ p_{k,K} \end{pmatrix}, \text{ for } k \in \{1, \ldots, L\}. \quad (11)$$

In this example, the principal components are represented by vectors $P_k = (p_{k,1}, \ldots, p_{k,K})^T$ (dimension K×1), the i-th row of the vector containing the scalar product $p_{k,i} = X^{(i)} U_k$. From equation (11), it can be seen that the data (contained in the lagged vectors $X^{(i)}$) are projected onto orthogonal base vectors, which are not known a priori (such as e.g. for the Fourier analysis), but rather are calculated exclusively from the data (i.e. of the time series $X_a$). The result obtained for the SSA is L eigenvalues $\lambda_k$ and L corresponding principal components $P_k$ (k∈{1, ..., L}).

Unlike e.g. in the case of the Fourier analysis, no "prototypes" (also referred to as base functions) known a priori are used for principal components $P_k$ according to the example implementations described here. The principal components $P_k$ result directly from the analyzed data, without assumptions being made regarding the base functions. For the Fourier analysis, these base functions can be the complex exponential function $e^{j \cdot 2\pi k/N}$ for different (discrete) frequencies k/N (for k=1, ..., N). In the case of other transformations too, for example in the case of wavelet transformation, assumptions are made regarding the base function (which is usually referred to as a "mother wavelet" $\psi(t)$). The base functions form a complete orthonormal basis (complete orthonormal system). In the example implementations described here, this is formed by the L eigenvectors $U_k$, which can be calculated solely from the data (in a column of a radar data array) and without further assumptions about the base functions.

Figure 12:
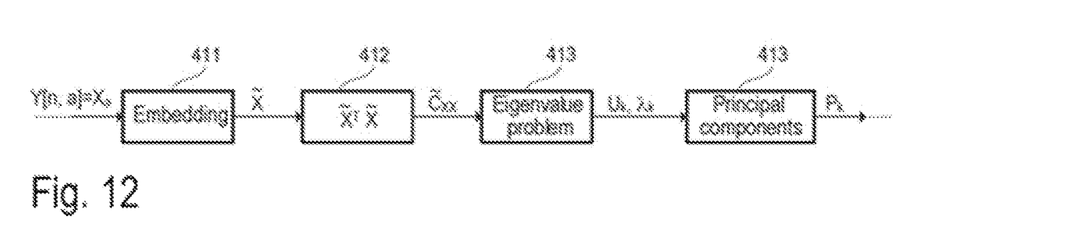
FIG. 12 uses an example flowchart to illustrate the decomposition of a digital radar signal into the principal components thereof by means of SSA.

The individual steps for ascertaining the principal components are combined in FIG. 12. In this case, step 411 denotes the embedding, step 412 denotes the calculation of the autocorrelation matrix $\tilde{C}_{XX}$, step 413 denotes the solution to the eigenvalue problem (calculation of the eigenvalues $\lambda_k$ and of the eigenvectors $U_k$) and step 414 denotes the calculation of the principal components $P_k$, which are calculated based on the data (contained in the column under consideration in a radar data array $Y[n, a]$) and the calculated orthonormal basis (eigenvectors). At this juncture, it should once again be stressed that no assumptions regarding base functions need to be made for ascertainment of the orthonormal basis.

In a further step, the time series $X_a$ is reconstructed from the principal components $P_k$ and the eigenvectors, with only the relevant principal components (i.e. those representing one or more radar echoes) being used for the reconstruction, and the remaining principal components (i.e. those representing interference signals/interference) being rejected. The reconstructed time series (filtered by means of SSA) is denoted by $\hat{X}_a$. Various criteria according to which principal components relevant to the radar measurements can differ from irrelevant principal components are discussed later on.

The set P* of relevant principal components for the radar measurement is denoted by P*, where P*={$P_k$} for k∈E. The set E thus contains the indices of the principal components relevant to the radar measurement ($E \subseteq \{1, \ldots, L\}$). When reconstructing the time series, the aforementioned projection is reversed and the time scale is restored. The latter is typically necessary because the principal components $P_k$ contain merely $K=N-L+1$ samples and not N samples like the original time series $X_a$. The k-th reconstructed component $\hat{R}_k$ (where $k \in E$) can be calculated according to the following equation:

$$\tilde{R}_k = P_k U_k^T = \begin{pmatrix} X^{(1)} U_k u_{k,1} & X^{(1)} U_k u_{k,2} & \ldots & X^{(1)} U_k u_{k,L} \\ X^{(2)} U_k u_{k,1} & X^{(2)} U_k u_{k,2} & & X^{(2)} U_k u_{k,L} \\ \vdots & & \ddots & \vdots \\ X^{(K)} U_k u_{k,1} & X^{(K)} U_k u_{k,2} & \ldots & X^{(K)} U_k u_{k,L} \end{pmatrix} \quad (12)$$

The matrix $\tilde{R}_k$ has the dimension $K \times L$ and contains the values on which the reconstruction of the k-th component of the time series $X_a$ is based.

Figure 14:
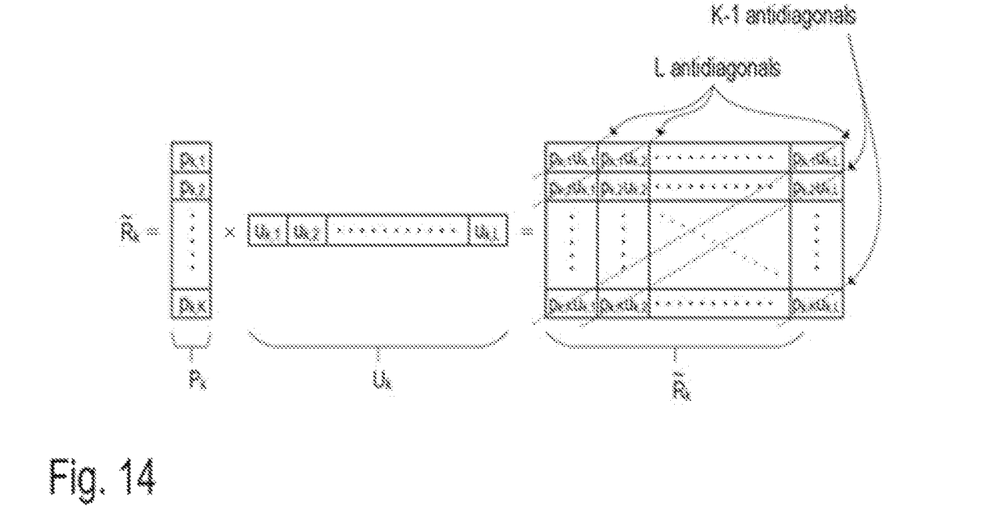
FIG. 14 is a schematic depiction of part of the signal reconstruction shown in FIG. 13.

Restoration of all N components of the time series $X_a$ (i.e. of the samples $y_a[n]$ of the a-th column in the radar data array $Y[n, m]$) can be accomplished by means of averaging over all antidiagonals of the matrix $\hat{R}_k$, the matrix $\tilde{R}_k$ having $K+L-1=N$ antidiagonals. This process is depicted schematically in FIG. 14. The mean value of the n-th antidiagonals is provided by the following equation:

$$r_k^{(n)} = \frac{1}{\min\{n, L, N-n+1\}} \sum_{b=1}^{L} X^{(n-b+1)} U_k u_{k,b} \quad (13)$$

where the summand $X^{(i-b+1)} U_k u_{k,b}$ is zero if $(i-b+1)<1$ or $(i-b+1)>K$, and where the averaging needs to take into consideration that equation 13 has fewer than L non-zero summands for the first L−1 antidiagonals and the last L−1 antidiagonals.

The reconstructed time series $\hat{X}_a$ is obtained by summation of the mean values $r_k^{(i)}$ for $k \in E$, e.g. only the relevant principal components $P_k$ are taken into consideration. The reconstructed time series $\hat{X}_a$ can accordingly be calculated as follows:

$$\hat{X}_a = (\hat{x}_1, \ldots, \hat{x}_n, \ldots, \hat{x}_N)^T, \text{ where} \quad (14)$$

$$\hat{x}_n = \Sigma_{k \in E} r_k^{(n)} = \hat{y}_a[n]. \quad (15)$$

Figure 13:
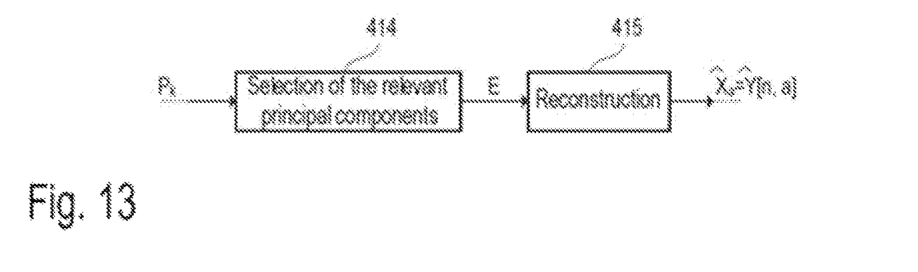
FIG. 13 uses an example flowchart to illustrate the reconstruction of the (filtered) digital radar signal from the ascertained principal components.

The reconstruction of the time series is depicted in FIG. 13. A first step 414 involves the principal components relevant to the radar measurement being ascertained (set E), and a further step 415 involves the reconstructed "filtered" time series $\hat{X}_a = Y[n, a]$ being ascertained from the relevant principal components. The filtering is caused by step 414 involving the principal components that are not relevant to the radar measurement being rejected and thus no longer being taken into consideration for the reconstruction (equations (13) to (15)).

The eigenvalues $\lambda_k$ and the principal components $P_k$ are analyzed in more detail below for an illustrated, simulated radar signal $X_a = Y[n, a]$ (with $N=2^{11}=2048$ samples), in order to arrive at a criterion that is suitable for identifying principal components $P_k$ that represent radar echoes and are those relevant to the radar measurement. In the present example, the window length L has been defined as $L=128$. Thus, 128 eigenvalues $\lambda_k$ and 128 corresponding principal components $P_k$ are obtained.

Figure 15:
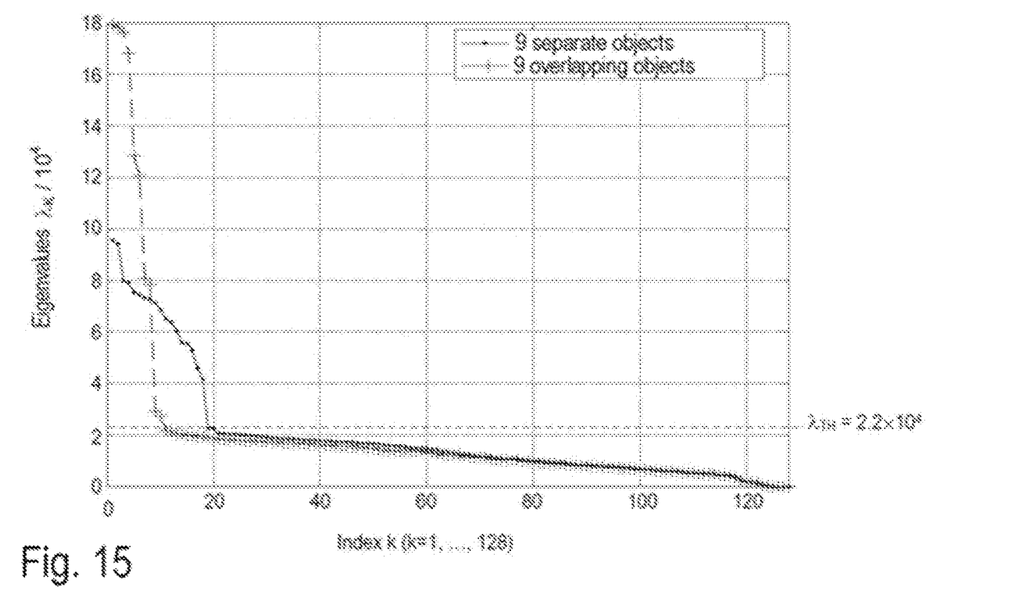
FIG. 15 shows the eigenvalue spectrum calculated by means of SSA for an example simulated example.

FIG. 15 uses a graph to show—for the simulated radar signal—the spectrum of the eigenvalues $\lambda_k$, each eigenvalue having an associated corresponding principal component $P_k$. The eigenvalues $\lambda_k$ are usually sorted, so that $\lambda_1 < \ldots < \lambda_L < 0$, and are a measure of the power of the corresponding principal components $P_k$. The relevant principal components $P_k$ can be selected e.g. based on the eigenvalues $\lambda_k$. By way of example, the reconstruction/filtering (cf. FIG. 13) can take into consideration only those principal components $P_k$ for which the corresponding eigenvalue $\lambda_k$ is greater than a threshold value $\lambda_k$, i.e.

$$P^* = \{P_k\} | \lambda_k > \lambda_{TH}, \text{ and} \quad (16)$$

$$E = \{k\} | \lambda_k > \lambda_{TH}. \quad (17)$$

In this case, P* denotes the set of relevant principal components $P_k$ and E denotes the corresponding index set.

A selection of the relevant principal components $P_k$ based on the eigenvalues $\lambda_k$ can lead to useful results in some applications. However, a comparison with a threshold value $\lambda_{TH}$, such as e.g. according to equation (16), does not necessarily lead to interference signal components (cf. equation (3)) from other radar sensors (cf. FIG. 5, radar sensor 1') being satisfactorily rejected in the radar data $Y[n, m]$.

Figure 16:
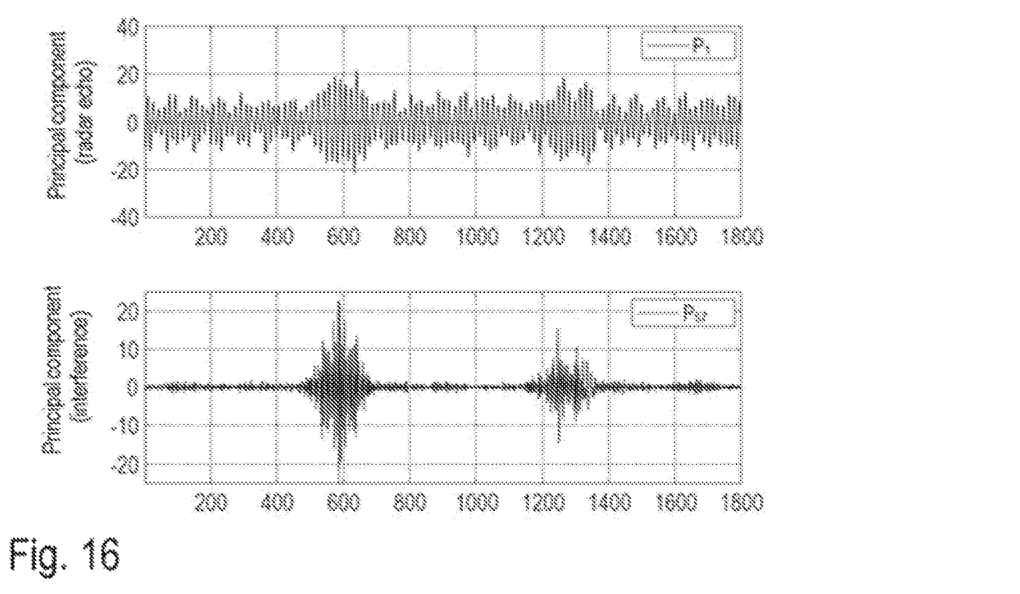
FIG. 16 shows different principal components for the simulated example.

FIG. 16 contains two graphs depicting different principal components $P_k$ for the simulated example. The upper graph shows the principal component $P_1$ and the lower graph from FIG. 16 shows the principal component $P_{57}$. These each contain $K=N-L+1=1921$ samples. It can be seen that the principal components depicted in the upper graph of FIG. 16 represent a continuous oscillation, as would be expected for a radar echo from a real radar target (beat frequency on the basis of a radar target). By contrast, the principal components depicted in the lower graph of FIG. 16 include only short bursts, that is to say that the oscillation is concentrated over a comparatively short time interval. This behavior is expected, in view of the explanations pertaining to FIGS. 7 and 8, of interference effects on the basis of interference signals from "foreign" radar sensors. A parameter $C_k$ is defined below, which is a measure of the (temporal) concentration of the oscillation within a corresponding principal component $P_k$. In one example implementation, the concentration parameter $C_k$ can be calculated as follows:

$$C_k = (\Sigma_{i=1}^{K} |p_{k,i}|^2) / (\Sigma_{i=1}^{K} |p_{k,i}|)^2. \quad (18)$$

In general, the concentration parameter $C_k$ can be regarded as a measure of how highly concentrated the signal energy of the associated principal component $P_k$ is over time. It goes without saying that there are also other options for calculating a suitable concentration parameter $C_k$.

Figure 17:
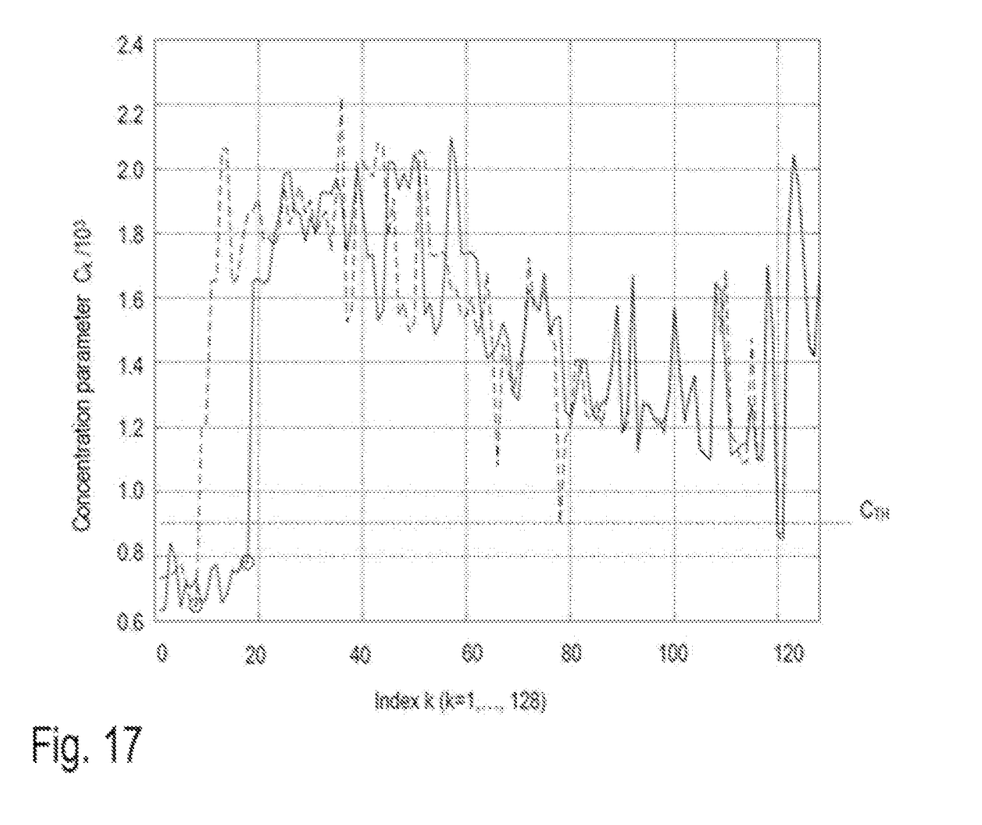
FIG. 17 is a graph depicting, for the simulated example, the characteristic of a concentration parameter that can be used for selecting the principal components relevant to the radar measurement.

FIG. 17 uses a graph to show the concentration parameter $c_k$ for $k=1, \ldots, L$ for the aforementioned simulated example ($L=128$). The concentration parameter $C_k$ is all the greater the more highly concentrated the oscillations within a principal component $P_k$ are over a time interval. For continuous oscillations, the concentration parameter $C_k$ is comparatively small. In the simulated example mentioned, the concentration parameter $C_k$ for the principal components $P_1$ and $P_2$ (see upper graph in FIG. 16) is approximately $0.65 \cdot 10^{-3}$ and $0.75 \cdot 10^{-3}$, respectively, and increases up to three-fold for higher k. The relevant principal components $P_k$ can be selected based on the corresponding concentration parameters $C_k$. A principal component $P_k$ is categorized as relevant e.g. if the corresponding concentration parameter $C_k$ is below a threshold value $C_{TH}$, i.e.

$$P^* = \{P_k\} | C_k < C_{TH}, \text{ and} \quad (19)$$

$$E = \{k\} | C_k < C_{TH}. \quad (20)$$

In this case, P* denotes the set of relevant principal components $P_k$ and E denotes the corresponding index set. In the example depicted, the principal component $P_{121}$ would also be categorized as relevant. Although the high index k=121 indicates a comparatively low eigenvalue and hence a comparatively low signal power, the low concentration parameter $C_k$ indicates a more or less continuous oscillation that is not concentrated over a short time interval within the principal component $P_{121}$, which can be an indication of a real radar echo.

The approach described here for interference signal rejection by means of SSA can be performed for any chirp echo affected by interference (i.e. for any affected column in a radar data array Y[n, m]). To identify interference in affected chirp echoes, inherently known techniques can be used, such as e.g. adaptive threshold value methods in the time domain (e.g. time-domain adaptive thresholding), methods with a constant false alarm rate (CFAR methods), and related methods. As can be seen in equation (11), the number of eigenvalues $\lambda_k$ and hence the number of principal components $P_k$ are dependent on the window length L. In FIG. 15, it can also be seen that the number of principal components $P_k$ is twice as great as the number of distinguishable (non-overlapping) radar targets in the measurement area of the radar sensor. In addition, the window length should be long enough for at least one oscillation at the lowest occurring frequency (for a given measurement area of the radar sensor) to have room. Simulations have shown that window lengths of from 128 to 256 have delivered satisfactory results for acceptable computation times. The desired interference signal rejection/filtering is achieved by virtue of only the principal components identified as relevant being taken into consideration for the reconstruction of the digital radar signal (of the respective column in the radar data array). Based on the filtered radar data array, a range-Doppler analysis can be performed for detecting the radar targets.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A method comprising:
    receiving, by a radar receiver of a radar apparatus, a plurality of chirp echoes from transmitted radar signals;
    generating, by the radar receiver, a digital signal based on the plurality of chirp echoes,
        wherein the plurality of chirp echoes, have a plurality of associated subsequences of the digital signal; and
    performing, by a computing unit of the radar apparatus, a filtering in a time domain for a subsequence of the plurality of associated subsequences,
        wherein performing the filtering for the subsequence comprises:
            decomposing the subsequence into a plurality of components;
            selecting a subset of components from the plurality of components; and
            constructing a modified subsequence, associated with the subsequence, based on the subset of components.

2. The method as claimed in claim 1, wherein decomposing the subsequence into the plurality of components is based on an orthonormal basis associated with data contained in the subsequence, or wherein decomposing the subsequence into the plurality of components is based on an autocorrelation matrix associated with the data contained in the subsequence.

3. The method as claimed in claim 1, wherein selecting the subset of components is based on eigenvalues, associated with the plurality of components, relative to a threshold value, or wherein selecting the subset of components is based on a concentration parameter, for each of the plurality of components, relative to the threshold value.

4. The method as claimed in claim 2, wherein decomposing the subsequence into the plurality of components comprises:
    calculating the orthonormal basis based on the data contained in the subsequence and without using one or more predefined base functions; and
    calculating the plurality of components based on the data contained in the subsequence and the orthonormal basis.

5. The method as claimed in claim 2, wherein decomposing the subsequence into the plurality of components comprises:
    calculating the autocorrelation matrix based on the data contained in the subsequence;
    calculating eigenvectors of the autocorrelation matrix; and
    calculating the plurality of components based on the eigenvectors and the data contained in the subsequence.

6. The method as claimed in claim 5, wherein constructing the modified subsequence comprises:
    multiplying each component of the subset of components by a corresponding eigenvector, of the eigenvectors, to produce, for each component of the subset of components, a particular matrix having a number of antidiagonals that corresponds to a length of the subsequence of the digital signal; and
    calculating the modified subsequence based on mean values of matrix elements in the antidiagonals of the particular matrix corresponding to each component of the subset of components.

7. The method as claimed in claim 3, wherein selecting the subset of components comprises:
    comparing the eigenvalues, associated with the plurality of components, with the threshold value; and
    selecting the subset of components based on a result of the comparing.

8. The method as claimed in claim 3, wherein selecting the subset of components comprises:
    calculating the concentration parameter for each of the plurality of components;

comparing the concentration parameter, of each of the plurality of components, with the threshold value; and selecting the subset of components from the plurality of components based on a result of the comparing.

9. The method as claimed in claim 8, wherein the concentration parameter is a measure of concentration of a signal energy of an associated principal component over a period of time.

10. A method, comprising:

receiving, by a radar receiver of a radar apparatus, a plurality of chirp echoes from transmitted radar signals;

generating, by the radar receiver, a digital signal based on the plurality of chirp echoes, wherein the plurality of chirp echoes have a plurality of associated subsequences of the digital signal; and performing, by a computing unit of the radar apparatus, a filtering in a time domain, for a subsequence of the plurality of associated subsequences, using singular spectrum analysis.

11. A radar apparatus, comprising:

a radar receiver configured to:

receive a plurality of chirp echoes from transmitted radar signals, and generate a digital signal based on the plurality of chirp echoes, wherein the plurality of chirp echoes have a plurality of associated subsequences of the digital signal; and a computing unit configured to perform a filtering for a subsequence, of the plurality of associated subsequences, in a time domain, wherein the computing unit, when performing the filtering for the subsequence, is configured to perform:

decompose the subsequence into a plurality of components;

select a subset of components from the plurality of components; and construct a modified subsequence, associated with the subsequence, based on the subset of components.

12. The radar apparatus as claimed in claim 11, wherein decomposing the subsequence into the plurality of components is based on an orthonormal basis of data contained in the subsequence, or wherein decomposing the subsequence into the plurality of components is based on an autocorrelation matrix.

13. The radar apparatus as claimed in claim 11, wherein selecting the subset of components is based on eigenvalues associated with the plurality of components relative to a threshold value, or wherein selecting the subset of components is based on a concentration parameter for each of the plurality of components relative to the threshold value.

14. The radar apparatus as claimed in claim 11, wherein the radar apparatus is a radar sensor.

15. The radar apparatus as claimed in claim 12, wherein the computing unit, when decomposing the subsequence into the plurality of components, is configured to:

calculate the orthonormal basis based on the data contained in the subsequence and without using one or more predefined base functions; and calculate the plurality of components based on the data contained in the subsequence and the orthonormal basis.

16. The radar apparatus as claimed in claim 12, wherein the computing unit, when decomposing the subsequence into the plurality of components, is configured to:

calculate the autocorrelation matrix based on the data contained in the subsequence;

calculate eigenvectors of the autocorrelation matrix; and calculate the plurality of components based on the eigenvectors and the data contained in the subsequence.

17. The radar apparatus as claimed in claim 16, wherein the computing unit, when constructing the modified subsequence, is configured to:

multiply each component of the subset of components by a corresponding eigenvector, of the eigenvectors, to generate, for each component of the subset of components, a particular matrix having a number of antidiagonals that corresponds to a length of the subsequence of the digital signal; and calculate the modified subsequence based on mean values of matrix elements in the antidiagonals of the particular matrix corresponding to each component of the subset of components.

18. The radar apparatus as claimed in claim 13, wherein the computing unit, when selecting the subset of components, is configured to:

compare the eigenvalues, associated with the plurality of components, with the threshold value; and select the subset of components based on a result of the comparing.

19. The radar apparatus as claimed in claim 13, wherein the computing unit, when selecting the subset of components, is configured to:

calculate the concentration parameter for each of the plurality of components;

compare the concentration parameter, of each of the plurality of components, with the threshold value; and select the subset of components from the plurality of components based on a result of the comparing.

20. The radar apparatus as claimed in claim 19, wherein the concentration parameter is a measure of concentration of a signal energy of an associated principal component over a period of time.

* * * * *